United States Patent
Wiker et al.

(10) Patent No.: US 12,151,331 B2
(45) Date of Patent: Nov. 26, 2024

(54) MACHINE TOOL DEVICE FOR OPEN-LOOP AND/OR CLOSED-LOOP CONTROL OF AT LEAST ONE MACHINE TOOL FUNCTION OF A MACHINE TOOL

(71) Applicant: Robert Bosch GmbH, Stuttgart (DE)

(72) Inventors: Juergen Wiker, Stuttgart (DE); Matthias Schneider, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1002 days.

(21) Appl. No.: 16/649,937

(22) PCT Filed: Sep. 14, 2018

(86) PCT No.: PCT/EP2018/074946
§ 371 (c)(1),
(2) Date: Aug. 26, 2021

(87) PCT Pub. No.: WO2019/057639
PCT Pub. Date: Mar. 28, 2019

(65) Prior Publication Data
US 2021/0394326 A1    Dec. 23, 2021

(30) Foreign Application Priority Data
Sep. 21, 2017   (DE) ............... 10 2017 216 697.5

(51) Int. Cl.
*B25F 5/00*   (2006.01)
*B23Q 11/00*  (2006.01)
*G05B 19/4063*  (2006.01)

(52) U.S. Cl.
CPC ...... *B23Q 11/0085* (2013.01); *B23Q 11/0092* (2013.01); *G05B 19/4063* (2013.01); *G05B 2219/42122* (2013.01)

(58) Field of Classification Search
CPC ... B25F 5/00; B23Q 11/0085; B23Q 11/0092; B23Q 17/00; G05B 19/4063;
(Continued)

(56) References Cited

U.S. PATENT DOCUMENTS

| 5,584,619 A | 12/1996 | Guzzella |
| 2013/0187587 A1 | 7/2013 | Knight et al. |

(Continued)

FOREIGN PATENT DOCUMENTS

| CN | 1111334 A | 11/1995 |
| CN | 103009353 A | 4/2013 |

(Continued)

OTHER PUBLICATIONS

International Search Report corresponding to PCT Application No. PCT/EP2018/074946, mailed Dec. 20, 2018 (German and English language document) (5 pages).

*Primary Examiner* — Gabriel Agared
(74) *Attorney, Agent, or Firm* — Maginot, Moore & Beck LLP

(57) ABSTRACT

A machine tool device in one embodiment is configured to provide open-loop and/or closed-loop control of at least one machine tool function of a portable machine tool. The machine tool device includes at least one detection unit configured to detect at least one characteristic variable of the machine tool and/or of a processing tool arranged on the machine tool. The machine tool device further includes at least one brake unit, wherein at least one brake function of the brake unit is adapted at least partially automatically, and in particular dynamically, depending on the at least one detected characteristic variable.

14 Claims, 3 Drawing Sheets

(58) Field of Classification Search
CPC ........ G05B 2219/42122; G05B 19/042; G05B 2219/2613
USPC ........................................................ 318/365
See application file for complete search history.

(56) References Cited

U.S. PATENT DOCUMENTS

| | | | |
|---|---|---|---|
| 2014/0166323 A1* | 6/2014 | Cooper | F16P 3/147 |
| | | | 173/176 |
| 2016/0279782 A1* | 9/2016 | Ullrich | B25D 16/00 |
| 2017/0264219 A1* | 9/2017 | Takeda | H02P 6/17 |

FOREIGN PATENT DOCUMENTS

| | | |
|---|---|---|
| CN | 103448035 A | 12/2013 |
| CN | 107000184 A | 8/2017 |
| DE | 10 2011 089 343 A1 | 6/2013 |
| DE | 10 2014 209 032 A1 | 7/2015 |
| DE | 10 2015 205 172 A1 | 9/2016 |
| JP | S64-45585 A | 2/1989 |
| JP | H07-253192 A | 10/1995 |
| JP | 2015-39750 A | 3/2015 |
| JP | 2015-100156 A | 5/2015 |
| JP | 2017-509493 A | 4/2017 |
| JP | WO2017/115594 A1 | 7/2017 |
| WO | 2017/115594 A1 | 7/2017 |

\* cited by examiner

MACHINE TOOL DEVICE FOR OPEN-LOOP AND/OR CLOSED-LOOP CONTROL OF AT LEAST ONE MACHINE TOOL FUNCTION OF A MACHINE TOOL

This application is a 35 U.S.C. § 371 National Stage Application of PCT/EP2018/074946, filed on Sep. 14, 2018, which claims the benefit of priority to Serial No. DE 10 2017 216 697.5, filed on Sep. 21, 2017 in Germany, the disclosures of which are incorporated herein by reference in their entirety.

BACKGROUND

Already known from US 2013/0187587 A1 is a power tool device for open-loop and/or closed-loop control of at least one power tool function of a portable power tool, comprising an acquisition unit, having at least one sensor unit, for acquiring characteristic variables of the portable power tool, in particular characteristic variables of a motor operation of the portable power tool.

SUMMARY

The disclosure is based on a power tool device for open-loop and/or closed-loop control of at least one power tool function of a power tool, in particular a portable power tool, comprising at least one acquisition unit for acquiring at least one characteristic variable of the power tool and/or of a work tool arranged on the power tool.

It is proposed that the power tool device comprise at least one braking unit, wherein at least one braking function of the braking unit can be adapted at least partially automatically, in particular dynamically, in dependence on the at least one acquired characteristic variable.

A "power tool" is to be understood here to mean, in particular, a machine for performing work on workpieces.

The power tool may be of a battery-operated or cable-connected design. In particular, the portable power tool is realized as an oscillation power tool, having a tool, driven in an oscillating manner, that is arranged and/or can be arranged on the oscillation power tool, wherein the tool driven in an oscillating manner can be driven at an oscillation frequency, preferably in a kHz range. Particularly preferably, the power tool is realized as an angle grinder. The power tool may be realized as a battery-operated angle grinder or as a cable-connected angle grinder. It is also conceivable, however, for the power tool to be of a different design, considered appropriate by persons skilled in the art, such as, for example, as a chainsaw, garden appliance, electric plane, power drill, power sander, hammer drill and/or chisel hammer, or as a multifunction power tool. A "portable power tool" is to be understood to mean, in particular, a power tool that can be transported by an operator without the use of a transport machine. The portable power tool has, in particular, a mass of less than 40 kg, preferably less than 10 kg, and particularly preferably less than 5 kg.

A "work tool" is to be understood here to mean, in particular, a tool that is arranged and/or that can be arranged, in particular, directly or indirectly on the power tool and that, in at least one operating state, is at least partially in direct contact with at least one workpiece and performs work on the workpiece.

"Dynamically" is to be understood here to mean, in particular, as being active continuously over time and/or continually active and/or actively or passively changeable within a period of time and/or for a duration of a process. That a braking function is dynamically adaptable is to be understood to mean, in particular, that an effect of the braking function has a characteristic profile, continuously controlled by open-loop and/or closed loop control, that is non-static, time-variable and/or time-limited for a duration of a process and/or adapted to a value of a characteristic variable. In particular, the braking function is dynamically adaptable in a time range in which a movement state of the work tool changes. In particular, this is intended to prevent abrupt, non-variable braking with a constantly applied braking torque. "Designed" is to be understood to mean, in particular, specially programmed, specially configured and/or specially equipped. That a device and/or a unit are/is designed for a particular function, is to be understood to mean, in particular, that the device and/or the unit fulfill/fulfills and/or execute/executes this particular function in at least one application state and/or operating state.

A "characteristic variable" is to be understood to mean, in particular, an operating parameter that is preferably correlated with a physical and/or chemical state of a power tool and/or of a work tool arranged on the power tool, and/or with a physical and/or chemical property of an environment. In particular, the characteristic variable may be correlated with a spatial position, in particular an attitude and/or orientation, in particular with respect to a reference point, with a state of movement and/or acceleration, a temperature, a magnetic field, an electric field, an electromagnetic radiation, a rotational speed and/or a torque of a motor of the power tool, a rotational speed and/or a torque of a part of the power tool and/or a work tool arranged on the power tool, and/or a further property considered appropriate by persons skilled in the art.

An "acquisition unit" is to be understood to mean, in particular, a unit designed to acquire at least one characteristic variable, wherein an acquisition may be effected actively, such as, in particular, by the generation and emission of an electrical measurement signal, and/or passively, such as, in particular, by acquisition of changes in the properties of the acquisition unit.

In particular, the acquisition unit may have one or more acquisition elements. The acquisition element is designed, in particular, to acquire at least one particular characteristic variable, wherein an acquisition may be effected actively, such as, in particular, by the generation and emission of an electrical measurement signal, and/or passively, such as, in particular, by acquisition of changes in the properties of the acquisition unit. Preferably, the acquisition element has at least one sensor. In particular, the sensor may be realized as a mechanical, capacitive, resistive, magnetic, in particular geomagnetic, electrical, electromagnetic, acoustic and/or optical sensor. The sensor may be realized, in particular, as a power sensor, optical sensor, gyroscope, movement sensor, acceleration sensor, rotational-speed sensor, pressure sensor, temperature sensor, infrared sensor and/or orientation sensor.

The acquisition unit may be designed, in particular, for acquisition, initiated by a user and/or a machine, and/or for advantageously automatic and/or automated acquisition, of the signal provided by the acquisition unit and/or at least one acquisition element, for example continuously, at preferably regular time intervals and/or in dependence on at least one defined triggering event. Preferably, the braking unit is designed to perform a braking operation, wherein the work tool can be braked relative to a power tool housing. The braking operation is performed in dependence on the acquired characteristic variable. In particular, at least one braking function of the braking unit can be adapted automatically, in particular dynamically, by means of an open-loop and/or closed-loop control unit. In particular, the work tool can be braked to an almost complete standstill of the work tool, the kinetic energy of the work tool being at least substantially completely converted into another form of energy. It is conceivable that the work tool can be partially braked briefly, in particular dynamically, by braking pulses. A particularly advantageous braking operation can thereby be effected. An "open-loop and/or closed-loop control unit" is to be understood to mean, in particular, a unit having at least one set of control electronics. A "set of control electronics" is to be understood to mean, in particular, a unit having a processor unit and having a memory unit, and having an operating program stored in the memory unit. In particular, the operating program is designed to process received data. In this case, the open-loop and/or closed-loop control unit, the acquisition unit and the braking unit are preferably connected to each other by wire or wirelessly for electronic transmission of data. In particular, the open-loop and/or closed-loop control unit, the acquisition unit and the braking unit can receive data and/or transmit data among themselves or to other units.

A design according to the disclosure makes it possible, advantageously, to provide a generic power tool device that has improved braking properties. In particular, a braking function adapted to an operating situation of the power tool can be provided. Enhanced operational safety, as well as improved operating convenience, can advantageously be achieved for operation of the power tool by an operator.

It is additionally proposed that the acquisition unit have a drive acquisition element for acquiring a drive characteristic variable of a drive unit of the power tool and/or of the work tool, wherein the braking function can be adapted, at least partially automatically, in dependence on the drive characteristic variable. In particular, the drive characteristic variable may comprise characteristic variables that are correlated at least with an operating state of a drive unit of the power tool and/or of the work tool and/or of components of the drive unit such as, for example, a motor, ball bearings, gear wheels, movement converter elements and/or drive shafts and the like. The drive characteristic variable may be realized in the form of a drive current, a drive voltage, a drive power, a drive resistance, an electromotive power characteristic variable of the drive unit, a drive speed, or other drive characteristic variable considered appropriate by persons skilled in the art. In particular, the drive characteristic variable may be such that it can be acquired in the form of a drive torque. The drive acquisition element may comprise, in particular, at least one drive acquisition sensor. The drive acquisition sensor may preferably be realized as a drive-current sensor, drive-voltage sensor, drive-power sensor, drive-resistance sensor, electromotive-force characteristic-variable sensor of the drive unit, or as a drive-speed sensor. This allows the braking function to be adapted with particular precision to an operating situation and/or to a state of the power tool and/or of the work tool. In particular, adaptation of the braking function advantageously enables different work tools to be braked, with a suitable, in particular shortest, braking time, as well as a wear-optimized and a convenient braking and startup time, being determined for a respective power tool.

Furthermore, it is proposed that the drive characteristic variable comprise a startup characteristic variable. In particular, the startup characteristic variable has startup characteristic variable parameters that can be acquired during a dynamic transition of the power tool and/or of the work tool from an idle state of the power tool and/or of the work tool to at least one operating state of the power tool and/or of the work tool in which work can be performed the workpiece. The startup characteristic variable may be realized in the form of a startup power, a startup current, a startup voltage, a startup resistance, an electromotive startup force characteristic variable of the drive unit, a startup speed, a startup torque, or other startup characteristic variable considered appropriate by persons skilled in the art. The drive acquisition element may comprise, in particular, at least one startup acquisition sensor. The startup acquisition sensor may be realized, in particular, as a startup-current sensor, startup-voltage sensor, startup-power sensor, startup-resistance sensor, startup-time sensor, or as an electromotive startup-force characteristic-variable sensor. An inertia of the power tool and/or of the work tool can thus be determined, in particular during a startup operating state, and the braking function adapted selectively.

It is additionally proposed that the drive characteristic variable comprise a rotational-speed characteristic variable. In particular, the drive characteristic variable may comprise a rotational-speed characteristic variable of the power tool, in particular of the drive unit of the power tool and/or of the work tool. In particular, the rotational-speed characteristic variable may be realized as rotational speed, angular velocity and/or direction of rotation, the rotational-speed characteristic variable being measurable directly or indirectly. The drive acquisition unit may comprise, in particular, at least one rotational-speed sensor. In particular, the rotational-speed sensor acquires changes in a magnetic field that is correlated with a rotational speed of the power tool and/or of the work tool. The rotational-speed characteristic variable can thereby be used to determine an operating state of the power tool and/or of the work tool and, advantageously, to adapt the braking function in an appropriate manner. The operating safety of the power tool can thus be increased.

In particular, a startup time, until a specified nominal speed of the power tool and/or the work tool is attained, can be determined by means of the drive characteristic variable and the rotational-speed characteristic variable. This allows the braking function to be adapted and/or optimized.

It is also proposed that the drive characteristic variable comprise a torque characteristic variable. The torque characteristic variable may be realized in the form of a torque power, a torque current, a rotational speed and/or an electromotive torque-force characteristic variable of the drive unit. The drive acquisition element may comprise, in particular, at least one torque sensor. The torque sensor may be realized, in particular as a power sensor and/or as a rotational-speed sensor. This advantageously allows an operating state of the power tool and/or of the work tool to be determined. For example, an idling state of the power tool and/or of the work tool may differ from a working operating state. Moreover, it is possible to distinguish between power tools that differ in the magnitude of torque. This enables the braking function of the power tool device to be adapted selectively. The operator can thus be protected from injury during operation of the power tool.

In particular, the startup acquisition sensor and/or the rotational-speed sensor and/or the torque sensor may be realized as one sensor, or at least partially as one piece. That two or more sensors are realized "partially as one piece" is be understood to mean, in particular, that the sensors have at least one, in particular at least two, advantageously at least three common elements that are a component part, in particular a functionally important component part, of two or more sensors. It is conceivable for one sensor to acquire several characteristic variables, for example the rotational-speed characteristic variable and the torque characteristic variable.

It is additionally proposed that the acquisition unit have a kickback acquisition element for acquiring a kickback characteristic variable of the power tool and/or of the work tool, and the braking function can be adapted, at least partially automatically, in dependence on the kickback characteristic variable. The kickback acquisition element may comprise, in particular, at least one kickback sensor. In particular, the open-loop and/or closed-loop control unit takes the kickback characteristic variable into account in order to suitably adapt the braking function of the braking unit in at least one operating state, for example in the event of an abrupt stopping of the work tool, in particular to avoid uncontrolled movement of the power tool connected to the work tool. Preferably, the kickback sensor is realized as a movement sensor and/or acceleration sensor and/or rotational-speed sensor, the open-loop and/or closed-loop control unit processing the signal of the movement sensor and/or acceleration sensor and/or rotational speed sensor and, in particular, identifying a binding of the work tool and a movement of the power tool housing following transmission of an impulse from the work tool to the power tool housing.

In particular, it is conceivable for the kickback acquisition element and the drive acquisition element to be realized as one piece. That two units are realized "partially as one piece" is be understood to mean, in particular, that the units have at least one, in particular at least two, advantageously at least three common elements, in particular common sensors, that are a component part, in particular a functionally important component part, of both units. In particular, exceeding of a critical limit value of the torque characteristic variable may be interpreted by the open-loop and/or closed-loop control unit as a kickback characteristic variable, and the braking function adapted. It is also conceivable that, if a value of a rotational-speed characteristic variable change exceeds a critical limit value within a specified time range, for example within one millisecond, the open-loop and/or closed-loop control unit adapts the braking function appropriately. In this way, it becomes possible to achieve selective adaptation of the braking function, with the kickback characteristic variable being taken into account, and greater operational safety can be ensured. The operator in this case can continue to operate the power tool in a controlled manner, or put it out of operation without suffering injury from uncontrolled movement of the power tool and/or from an unsafe stance and a consequent possible fall of the operator.

It is additionally proposed that the acquisition unit have a wear acquisition element for acquiring a wear characteristic variable of the power tool and/or of the work tool, and the braking function can be adapted, at least partially automatically, in dependence on the wear characteristic variable. The wear acquisition element may comprise, in particular, at least one wear sensor. In particular, at least one sensor of the drive acquisition element may be designed as a wear sensor. In particular, the wear characteristic variable may be correlated with a weight of the work tool, and in particular a change in the weight of the work tool and/or of the power tool can be acquired, and it is thus possible to detect wear of the work tool and/or of the power tool. In particular, the wear characteristic variable may be correlated with a time required for a braking and/or starting operation of the work tool. Preferably, the wear characteristic variable can be ascertained indirectly during a startup operation and/or in a continuous operating state, in particular by determination of a value and/or value change for a current, a voltage, a power, a time, an electrical resistance and/or an electromotive-force characteristic variable. A comparison of the values and/or a value change, for example with a reference value table, can yield inferences about the state of wear of the power tool and/or the work tool. The wear sensor may be realized, in particular, as an unbalance sensor, power sensor, current sensor, voltage sensor, resistance sensor and/or force characteristic-variable sensor. In particular, the wear acquisition element and the drive acquisition element are realized as one piece. This allows costs to be reduced, owing to the use of a smaller number of components. In this way, the braking function can be adapted to a state of wear, in particular of the work tool, and in particular destruction of the work tool and/or the power tool and/or the workpiece on which work is to be performed can be prevented in good time. An increased operational safety can thus be achieved.

Further, it is proposed that the acquisition unit have a position acquisition element for acquiring a position characteristic variable of the power tool and/or of the work tool, and the braking function can be adapted, at least partially automatically, in dependence on the position characteristic variable. The position acquisition element may comprise, in particular, at least one position sensor. In particular, the position characteristic variable is intended for determination of a spatial position, in particular an attitude and/or orientation, of the power tool and/or of the work tool, and/or a relative location, in particular an attitude and/or orientation of the power tool and work tool relative to each other. Advantageously, the position characteristic variable is linked to a change in a spatial position of the power tool and/or of the work tool, whereby a particularly rapid change in the spatial position of the power tool and/or the work tool may indicate a malfunction such as, for example, a detachment of the work tool from the power tool that is potentially dangerous for the operator, and/or an uncontrolled movement of the tool. In particular, the position sensor may be realized as movement sensor. It is also conceivable, however, for the position sensor to be realized as a gyroscope, as a magnetometer for acquiring the position by measurement of a geomagnetic field, and/or as a GPS sensor. In this way, the braking function can be suitably adapted such that, in particular, no additional torque of the power tool can arise, thus ensuring operational safety and minimizing the risk of injury to the operator. In particular, this can prevent the power tool from twisting and/or slipping in the hands of the operator.

Furthermore, it is proposed that the acquisition unit have a fall acquisition element for acquiring a fall characteristic variable if the power tool and/or the work tool falls down, and the braking function can be adapted, at least partially automatically, in dependence on the fall characteristic variable. The fall acquisition element may comprise, in particular, at least one fall sensor. In particular, a free fall of the power tool and/or of the work tool can be acquired. In particular, the fall sensor may be realized as a movement and/or acceleration sensor. Advantageously, the fall sensor is realized as a 6-axis movement sensor that detects an acceleration and/or a rotation rate of the work tool and/or of the power tool, in particular with respect to 3 axes X, Y, Z of the Cartesian coordinate system. Further, the fall sensor may be realized as a piezoelectric acceleration sensor, as an acceleration sensor based on a spring-mass principle, or as an acceleration sensor based on magnetic induction. It is also conceivable that, in the event of the operator falling accidentally, the power tool is braked in an appropriate manner, thereby enabling an additional risk of injury to be reduced.

A suitable adaptation of the braking function can advantageously prevent, at least partially, an acceleration of the power tool and/or the work tool that results from non-adapted braking, and that is additional to an initial acceleration and an initial direction of movement of the power tool and/or the work tool, during free fall. In particular, operating accidents can thereby be prevented, and additional operational safety can be achieved. In particular, the position acquisition element and the fall acquisition element may be realized as one piece.

In addition, it is proposed that the acquisition unit have a holding-force acquisition element for acquiring a holding-force characteristic variable of the power tool and/or the work tool, and the braking function can be adapted, at least partially automatically, in dependence on the holding-force characteristic variable. The holding-force acquisition element may comprise, in particular, at least one holding-force sensor. A "holding-force characteristic variable" is to be understood to mean, in particular, a variable correlated with a force that counteracts a further force as a result of a force-locking, form-locking and/or materially bonded connection of two connection partners. In this case, the further force acts to spatially separate the two connection partners and/or to change a relative attitude and/or a relative orientation of the two connection partners in relation to each other. Preferably, such a connection exists between the power tool and the operator. In particular, the holding-force characteristic variable of the power tool can detect a safe connection between the power tool and the operator and thus, for example, a risk of unintentional release of the power tool, and can adapt the braking function accordingly. Preferably, the braking of the work tool may be effected in proportion to the holding-force characteristic variable. In particular, the holding-force sensor is realized as a pressure sensor, infrared sensor, acceleration sensor and/or movement sensor. In particular, the open-loop and/or closed-loop control unit processes the holding-force characteristic variable, together with the fall characteristic variable and/or the kickback characteristic variable, since an unintentional release of the power tool due to binding of the work tool arranged on the power tool can cause the power tool to fall. In this way, the braking function can be adapted more efficiently. The operating safety can thereby be increased in a particularly advantageous manner. Furthermore, the holding-force characteristic variable of the work tool may advantageously be correlated with a secure connection between the power tool and the work tool. In particular, an advantageous power transmission and correct functioning of the power tool can thereby be achieved.

Furthermore, it is proposed that the acquisition unit have a temperature acquisition element for acquiring a temperature characteristic variable of the power tool, in particular of a part of the power tool, and/or of the work tool, and the braking function can be adapted, at least partially automatically, in dependence on the temperature characteristic variable. The temperature acquisition element may comprise, in particular, at least one temperature sensor. The temperature sensor may be designed as an infrared sensor, resistance thermometer, thermocouple, or as a sensor that generates a temperature-dependent electrical signal. In particular, emergency braking may be initiated if a critical temperature is exceeded. Advantageously, it is thereby possible, in particular, to avoid malfunction and/or destruction resulting from overheating of the power tool and/or of the work tool during a braking operation. In particular, a fire hazard during the braking operation of the tool can thereby be minimized.

It is further proposed that the acquisition unit have an angle acquisition element for acquiring an angular-velocity characteristic variable and/or angular-acceleration characteristic variable of the power tool and/or of the work tool, and the braking function can be adapted, at least partially automatically, in dependence on the angular-velocity characteristic variable and/or angular-acceleration characteristic variable. The angle acquisition element may comprise, in particular, at least one angle sensor. In particular, the angular-velocity characteristic variable and/or angular acceleration characteristic variable may correlate with a safe positioning and/or disposition of the power tool and/or of the work tool in at least one operating state. Automatic adaptation of the braking function may be effected if a specified value for an angular velocity and/or angular acceleration is fallen short of and/or exceeded. Advantageously, the angle sensor may be realized as a rotation rate sensor. It is also possible for the angle sensor to be designed as a Hall sensor, potentiometric angle sensor and/or AMR angle sensor. In particular, the angular velocity and/or the angular acceleration may indicate insecure gripping of the power tool by the operator. Thus, advantageously, a safe and efficient braking operation can be performed. In particular, the position acquisition element and/or the fall acquisition element and/or the angle acquisition element may be realized as one piece. In particular, angular-velocity characteristic variable and/or an angular-acceleration characteristic variable and the drive characteristic variable may be used to control the braking function by open-loop and/or closed-loop control. Thus, for example, braking of the work tool may be adapted to the state of wear of the work tool. In particular, the adaptation of the braking function may be effected in dependence on the angular-velocity characteristic variable and/or an angular-acceleration characteristic variable with the holding-force characteristic variable. Rapid braking of the work tool can thus be achieved.

Also proposed is a method for operating a power tool device, wherein at least one braking function of the power tool device is adapted at least partially automatically, in particular dynamically, in dependence on at least one acquired characteristic variable of the power tool and/or of a work tool arranged on the power tool. Advantageously, a high degree of operating convenience can be realized. In particular, a high degree of operating safety can be achieved.

The power tool device according to the disclosure and the method for operating the power tool device are not intended in this case to be limited to the application and embodiment described above. In particular, the power tool device according to the disclosure and the method for operating the power tool device may have individual elements, component parts and units, and method steps, that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. The drawing shows exemplary embodiments of the disclosure. The drawing, the description and the claims contain numerous features in combination. Persons skilled in the art will also expediently consider the features individually and combine them to create appropriate further combinations.

There are shown.

DETAILED DESCRIPTION

Figure 1:
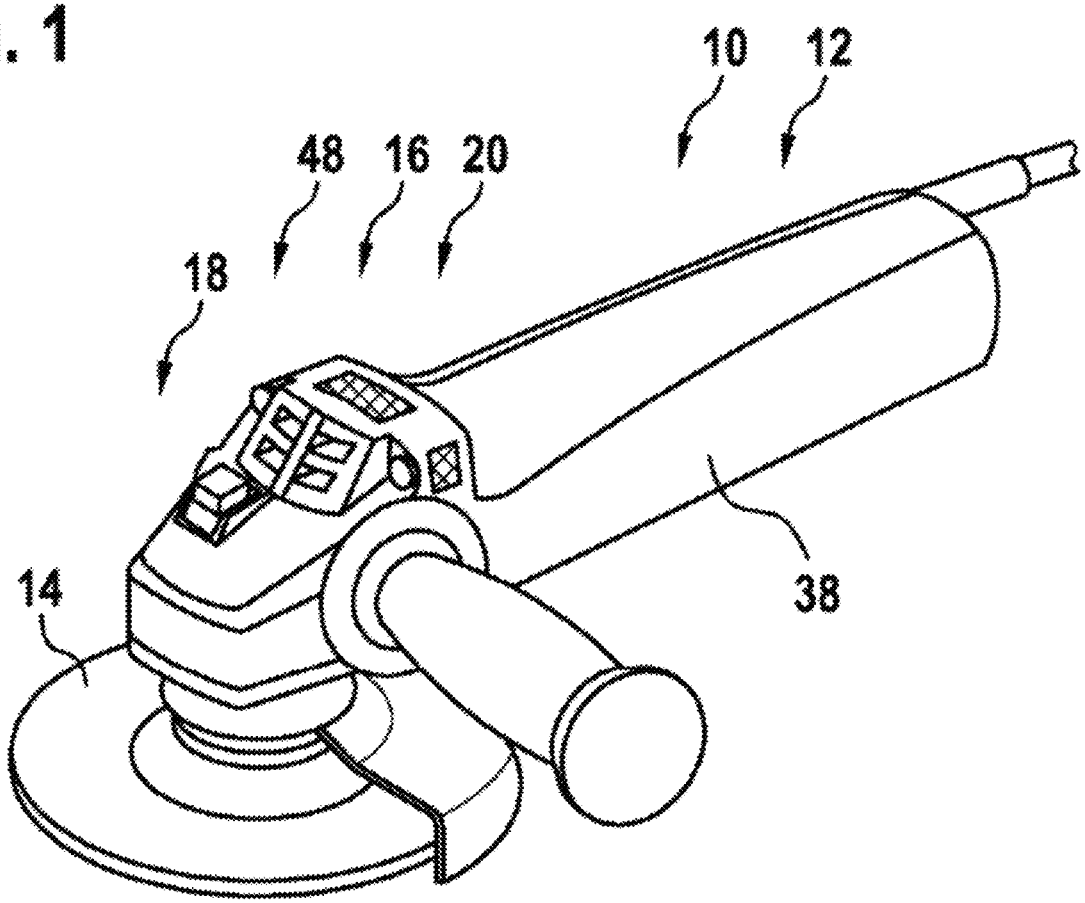
FIG. 1 a schematic view of a portable power tool, with a power tool device.

FIG. 1 shows a portable power tool 12. The power tool 12 is realized as an angle grinder. There is a work tool 14 arranged on the power tool 12. The work tool 14 is realized as a cutting or grinding disk. The power tool 12 comprises a drive unit 20 that, in at least one operating state, drives the work tool 14. The power tool 12 has a power tool housing 38. The drive unit 20 is arranged, at least partially, in the power tool housing 38.

The power tool 12 comprises a power tool device 10. The power tool device 10 is designed to control at least one power tool function of the power tool 12 by open-loop and/or closed-loop control.

The power tool device 10 has a braking unit 18. The braking unit 18 is arranged, at least partially, in the power tool housing 38. The braking unit 18 provides a braking function. The braking unit 18 is designed to brake the work tool 14, at least partially, or to bring it to a standstill.

The power tool device 10 has an open-loop and/or closed-loop control unit 48 that is designed to control the drive unit 20 and the braking unit 18.

Figure 2:
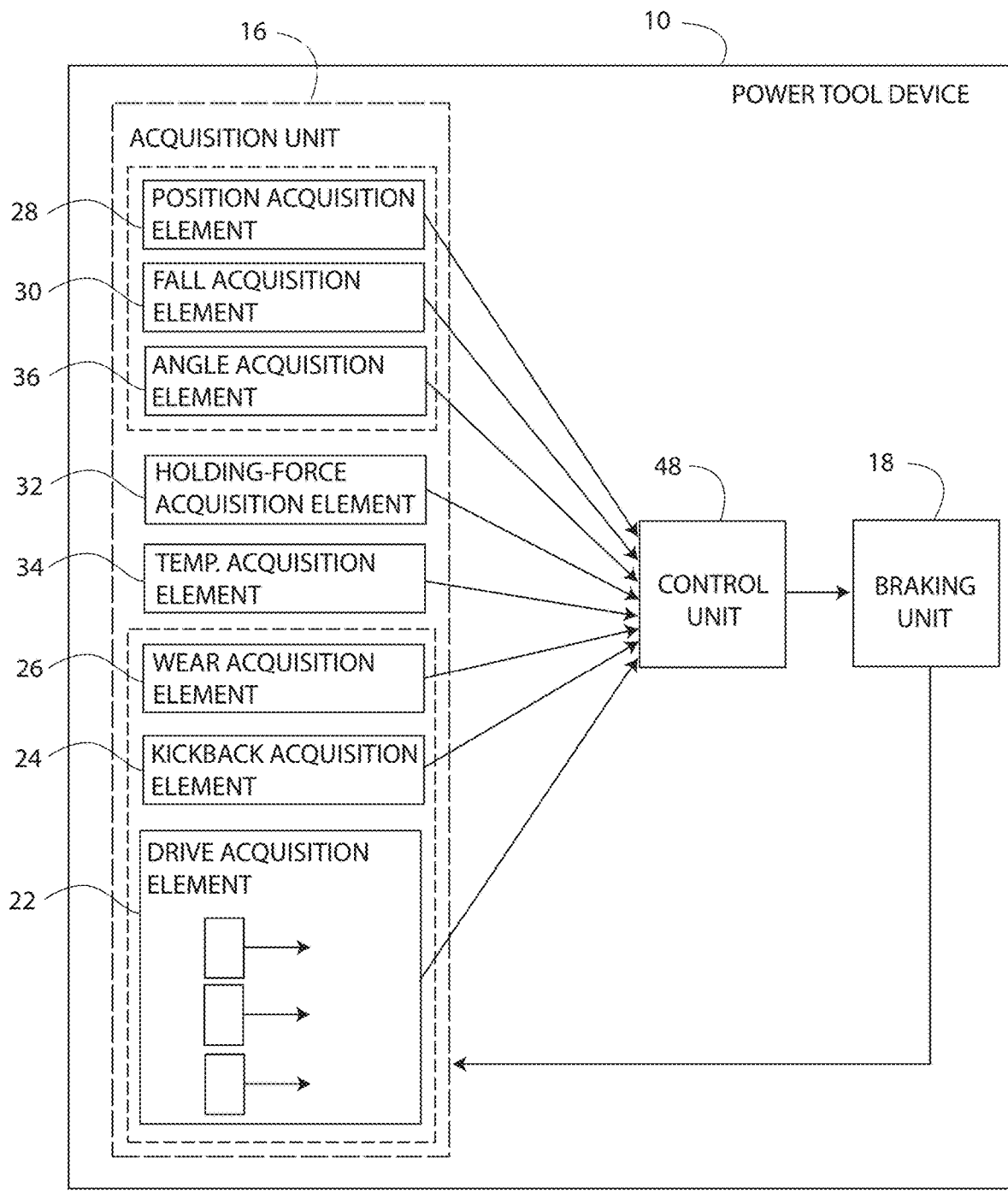
FIG. 2 a schematic representation of the power tool device, with an acquisition unit in various possible designs, and with a braking unit, and FIG. 3 a flow diagram of a method for operating the power tool device.

The power tool device 10 has an acquisition unit 16. The acquisition unit 16 is designed to acquire at least one characteristic variable of the power tool 12 and/or of the work tool 14 arranged on the power tool 12. The acquisition unit 16 is arranged, at least partially, in the power tool housing 38. The acquisition unit 16 may have one or also more acquisition elements (see FIG. 2).

The open-loop and/or closed-loop control unit 48 is connected to the acquisition unit 16 wirelessly or by a wired connection. The acquisition unit 16 transmits the acquired characteristic variables to the open-loop and/or closed-loop control unit 48 (see FIG. 2). The characteristic variables provided by the acquisition elements of the acquisition unit 16 can be evaluated, individually or in any combination, by means of the open-loop and/or closed-loop control unit 48. The open-loop and/or closed-loop control unit 48 can adapt at least one braking function of the braking unit 18 in dependence on the at least one characteristic variable acquired by the acquisition unit 16.

The acquisition unit 16 may have a drive acquisition element 22. The drive acquisition element 22 is designed to acquire a drive characteristic variable of the drive unit 20 of the power tool 12 and/or of the work tool 14. In particular, the drive unit 20 of the power tool 12 may have a motor, in particular an electric motor, and power transmission elements, for example a drive shaft, gear wheels and the like, for transmitting a motor power to the work tool 14. The braking function of the power tool may be automatically adaptable in dependence on the drive characteristic variable. The adaptation of the braking function is effected in a dynamic rotational speed range, in particular during a braking operation.

The drive characteristic variable may comprise a startup characteristic variable. The acquisition unit 16 takes account of the startup characteristic variable in the adaptation of the braking function of the braking unit 18. The startup characteristic variable can be acquired in the dynamic rotational speed range, in particular during ramping-up of the power tool 12, in particular following switch-on of the power tool 12, from an idling state into at least one operating state of the power tool having at least substantially constant rotational speed range.

In particular, the startup characteristic variable includes a time required for the ramping-up of the power tool 12. The startup characteristic variable includes a power consumed during the ramping-up of the power tool 12 until the power tool 12 attains at least one operating state for performing work on a workpiece.

The drive characteristic variable may comprise a rotational-speed characteristic variable. The rotational-speed characteristic variable comprises a parameter for a rotational speed, for a size of the work tool 14 and/or of the power tool 12 or of a power tool element that is correlated with the rotational speed. The rotational-speed characteristic variable may be such that it can be measured continuously or at defined intervals of time. The rotational-speed characteristic variable can be measured indirectly, in particular from a power consumption of the power tool 12 during active operation and by subsequent comparison of a measured power consumption value with reference values. The rotational-speed characteristic variable may differ for different work tools 14.

The drive characteristic variable may comprise a torque characteristic variable. The torque characteristic variable represents a characteristic value for differing work tools 14. In particular, the characteristic value of the torque characteristic variable correlated with a weight of the work tool 14 and/or with a weight distribution within the work tool 14. The torque characteristic variable may be such that it can be determined indirectly. In particular, the torque characteristic variable can be determined by means of a startup current. In addition, the torque characteristic variable could be correlated with a time for ramping-up of the power tool 12 and/or of the work tool 14.

The startup characteristic variable and/or the rotational-speed characteristic variable and/or the torque characteristic variable designed are intended to adapt the braking function of braking unit 18 of the power tool 12 individually or in any combination.

The acquisition unit 16 may have a wear acquisition element 26. The wear acquisition element 26 is designed to acquire a wear characteristic variable of the power tool 12 and/or of the work tool 14. The wear characteristic variable may be correlated with a change in weight of the work tool 14. The wear acquisition element 26 indirectly acquires the change in weight of the work tool 14. The change in weight can be measured in the dynamic rotational speed range, in particular during ramping-up of the power tool 12 and/or during braking of the power tool 12.

The wear acquisition element 26 may be realized separately from other acquisition elements. However, it is conceivable for the wear acquisition element 26 and the drive acquisition element 22 to be realized as one piece. It is also conceivable that the wear characteristic variable can be determined from the startup characteristic variable and/or the rotational-speed characteristic variable and/or the torque characteristic variable, with the aid of reference tables. The acquisition of the wear characteristic variable is intended, in particular, for determination of a degree of wear of the work tool 14. The acquisition of the wear characteristic variable makes it possible to distinguish between a worn work tool 14 and a new work tool 14 that differs from the worn work tool 14. The braking function can be adapted, at least partially automatically, in dependence on the wear characteristic variable.

The acquisition unit 16 may have a position acquisition element 28. The position acquisition element 28 is designed to acquire a position characteristic variable of the power tool 12 and/or of the work tool 14. The braking function of the braking unit 18 of the power tool device 10 can be adapted, at least partially automatically, in dependence on the position characteristic variable (see FIG. 2). The position characteristic variable represents a three-dimensional orientation of the power tool 12 and/or of the work tool 14. The position acquisition element 28 indicates a disadvantageous and/or hazardous orientation of the power tool 12 and/or of the work tool 14. The braking function of the braking unit 18 initiates an automatically adapted emergency braking operation on the basis of a transmitted signal of the position acquisition element 28.

The position acquisition element 28 may advantageously indicate a desired alignment of the power tool 12 and/or of the work tool 14, for example a horizontal or a vertical alignment. It is conceivable that, in particular, any orientation of the power tool 12 and/or of the work tool 14 can be specified for the purpose of selectively performing work on the workpiece. The braking function of the braking unit 18 can be adapted to the specified orientation of the power tool 12 and/or the work tool 14.

The acquisition unit 16 may have an angle acquisition element 36. The angle acquisition element 36 is designed to acquire an angular-velocity characteristic variable and/or an angular-acceleration characteristic variable of the power tool 12 and/or of the work tool 14. The braking function may be such that it can be adapted, at least partially automatically, in dependence on the angular-velocity characteristic variable and/or an angular-acceleration characteristic variable (see FIG. 2). The angle acquisition element 36 acquires the angular-velocity characteristic variable and/or the angular-acceleration characteristic variable at the start of the braking operation. If a limit value for the angular-velocity characteristic variable and/or the angular-acceleration characteristic variable is exceeded, the braking unit 18 adapts the braking function in such a manner that no uncontrolled twisting of the power tool 12 and/or of the work tool 14 occurs. If a value for the angular-velocity characteristic variable and/or the angular-acceleration characteristic variable falls short of the limit value for the same, rapid braking of the power tool 12 and/or of the work tool 14 is effected, due to the automatic adaptation of the braking function. The angle acquisition element 36 is preferably realized as a rotation rate sensor.

It is conceivable for the position acquisition element 28 and the angle acquisition element 36 to be realized as one unit, in the form of a 6-axis movement sensor.

The acquisition unit 16 may have a fall acquisition element 30. The fall acquisition element 30 is designed to acquire a fall characteristic variable if the power tool 12 and/or the work tool 14 falls down. The braking function can be adapted, at least partially automatically, in dependence on the fall characteristic variable (see FIG. 2). The fall characteristic variable detects an uncontrolled movement pattern and/or acceleration pattern of the power tool 12 and/or of the work tool 14. The fall characteristic variable includes a rotation rate of the power tool housing 38 of the power tool 12. The fall characteristic variable includes the rotational-speed characteristic variable of the work tool 14.

The braking function of the braking unit 18 prevents the power tool 12 and/or the work tool 14 from being braked completely if a limit value of the rotation rate of the power tool housing 38 is exceeded. The braking function thereby prevents an unintentional acceleration of the rotation rate of the power tool housing 38 due to conservation of angular momentum between the work tool 14 and the power tool 12.

The acquisition unit 16 may have a kickback acquisition element 24. The kickback acquisition element 24 is designed to acquire a kickback characteristic variable of the power tool 12 and/or of the work tool 14. The braking function can be adapted, at least partially automatically, in dependence on the kickback characteristic variable (see FIG. 2). Depending on the extent of the uncontrolled braking of the work tool 14, the acquisition unit 16 influences the braking function accordingly.

The acquisition unit 16 may have a holding-force acquisition element 32. The holding-force acquisition element 32 is designed to acquire a holding-force characteristic variable of the power tool 12 and/or of the work tool 14. The braking function can be adapted, at least partially automatically, in dependence on the holding-force characteristic variable (see FIG. 2). Preferably, the holding-force acquisition element 32 is realized as a pressure sensor. A time for complete braking of the power tool 12 and/or of the work tool 14 is correlated with the holding-force characteristic variable. The greater a holding force acting upon the power tool 12 and/or the work tool 14, the more rapidly the power tool 12 and/or the work tool 14 can be braked.

The acquisition unit 16 may have a temperature acquisition element 34. The temperature acquisition element 34 is designed to acquire a temperature characteristic variable of the power tool 12, in particular of a part of the power tool 12, and/or of the work tool 14. The braking function can be adapted, at least partially automatically, in dependence on the temperature characteristic variable (see FIG. 2). The temperature characteristic variable is correlated with at least one operating state of the power tool 12 and/or of the work tool 14. In the case of an operating state in which there is overheating of the power tool 12 and/or of the work tool 14, the braking unit 18 initiates emergency braking. Alternatively, the braking function can be adapted in such a manner that an operating state is possible in which the power tool 12 and/or the work tool can continue to perform work with reduced heat generation.

Figure 3:
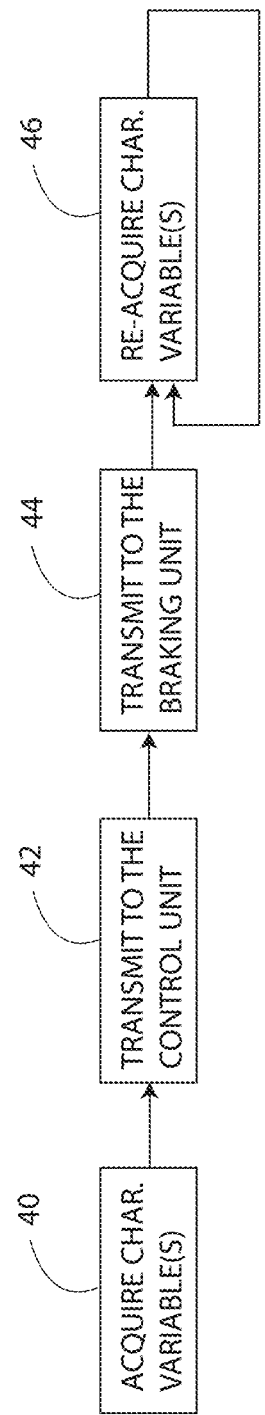

FIG. 3 shows a flow diagram of a method for operating a power tool device 10. The method comprises at least one first method step 40, in which a characteristic variable or a plurality of characteristic variables are acquired, simultaneously or in succession, by means of an acquisition element or a plurality of acquisition elements 22, 24, 26, 28, 30, 32, 34, 36.

The method comprises at least one second method step 42, in which the acquired characteristic variable or the acquired characteristic variables are transmitted to the open-loop and/or closed-loop control unit 48 for evaluation and/or processing.

The method comprises at least one third method step 44, in which open-loop and/or closed-loop control signals of the open-loop and/or closed-loop control unit 48 are transmitted to the braking unit 18. At least one braking characteristic variable of the braking unit 18 is thus adapted, at least partially automatically, in dependence on one or more characteristic variables.

The method comprises at least one fourth method step 46, in which the respective characteristic variable or the respective characteristic variables are re-acquired, by means of the acquisition element or the acquisition elements 22, 24, 26, 28, 30, 32, 34, 36, and transmitted to the open-loop and/or closed-loop control unit 48. In the fourth method step 46, the re-acquired characteristic variable or the re-acquired characteristic variables is/are compared, respectively, with the characteristic variable acquired in the first method step 40 or the characteristic variables acquired in the first method step 40, by the open-loop and/or closed-loop control unit 48. The open-loop and/or closed-loop control unit 48 determines a comparison result. At least one braking characteristic variable of the braking unit 18 is re-adapted, by means of the open-loop and/or closed-loop control signal of the acquisition unit 16, in dependence on the comparison result of the characteristic variables. In at least one operating state, the fourth method step is executed in a continuous loop during the entire operation of power tool 12.

The invention claimed is:

1. A power tool device for at least one of an open- loop and closed-loop control of at least one power tool function of a portable power tool, comprising:
at least one acquisition unit configured to acquire at least one characteristic variable of at least one of the portable power tool and a work tool arranged on the power tool, which comprises at least one braking unit,
wherein at least one braking function of the braking unit is configured to be adapted at least partially dynamically, in dependence on the at least one characteristic variable,
wherein the at least one characteristic variable is a wear characteristic variable,
wherein the acquisition unit has a wear acquisition element configured to acquire the wear characteristic variable of the at least one of the power tool and the work tool, and the braking function is configured to be adapted, at least partially automatically, in dependence on the wear characteristic variable, and
wherein the wear characteristic variable is correlated with a change in weight of the power tool.

2. The power tool device as claimed in 1, wherein:
the at least one characteristic variable includes a drive characteristic variable; and
the acquisition unit has a drive acquisition element configured to acquire the drive characteristic variable of a drive unit of the at least one of the portable power tool and the work tool, and the braking function is configured to be adapted, at least partially automatically, in dependence on the drive characteristic variable.

3. The power tool device as claimed in claim 2, wherein the drive characteristic variable comprises a startup characteristic variable.

4. The power tool device as claimed in claim 2, wherein the drive characteristic variable comprises a rotational-speed characteristic variable.

5. The power tool device as claimed in claim 2, wherein the drive characteristic variable comprises a torque characteristic variable.

6. The power tool device as claimed in claim 1, wherein:
the at least one characteristic variable includes a kickback characteristic variable; and
the acquisition unit has a kickback acquisition element configured to acquire the kickback characteristic variable of the at least one of the power tool and the work tool, and the braking function is configured to be adapted, at least partially automatically, in dependence on the kickback characteristic variable.

7. The power tool device as claimed in any claim 1, wherein:
the at least one characteristic variable includes a position acquisition characteristic variable; and
the acquisition unit has a position acquisition element configured to acquire the position characteristic variable of the at least one of the power tool and the work tool, and the braking function is configured to be adapted, at least partially automatically, in dependence on the position characteristic variable.

8. The power tool device as claimed in claim 1 wherein:
the at least one characteristic variable includes a fall characteristic variable; and
the acquisition unit has a fall acquisition element configured to acquire the fall characteristic variable when the at least one of the power tool and the work tool falls, and the braking function is configured to be adapted, at least partially automatically, in dependence on the fall characteristic variable.

9. The power tool device as claimed in claim 1 wherein:
the at least one characteristic variable includes a holding-force characteristic variable; and
the acquisition unit has a holding-force acquisition element configured to acquire the holding-force characteristic variable of the at least one of the power tool and the work tool, and the braking function is configured to be adapted, at least partially automatically, in dependence on the holding-force characteristic variable.

10. The power tool device as claimed in claim 1 wherein:
the at least one characteristic variable includes a temperature characteristic variable; and
the acquisition unit has a temperature acquisition element configured to acquire the temperature characteristic variable of a part of the at least one of the power tool and the work tool, and the braking function is configured to be adapted, at least partially automatically, in dependence on the temperature characteristic variable.

11. The power tool device as claimed in claim 1 wherein:
the at least one characteristic variable includes at least one of an angular-velocity characteristic variable and an angular-acceleration characteristic variable; and
the acquisition unit has an angle acquisition element configured to acquire the at least one of the angular-velocity characteristic variable and angular-acceleration characteristic variable of the at least one of the power tool and the work tool, and the braking function is configured to be adapted, at least partially automatically, in dependence on the at least one of the angular-velocity characteristic variable and angular-acceleration characteristic variable.

12. The portable power tool, having at least one power tool device as claimed in claim 1.

13. A method for operating the power tool device as claimed in claim 1, wherein the at least one braking function of the portable power tool device is adapted at least partially dynamically, in dependence on the at least one acquired characteristic variable of the at least one of the power tool and the work tool arranged on the power tool.

14. The power tool device as claimed in claim 1, wherein the wear characteristic variable is correlated with a change in weight of the work tool.

* * * * *